H. J. WIEGAND.
GEAR SHIFTING MECHANISM.
APPLICATION FILED AUG. 14, 1916.
1,313,362.
Patented Aug. 19, 1919.
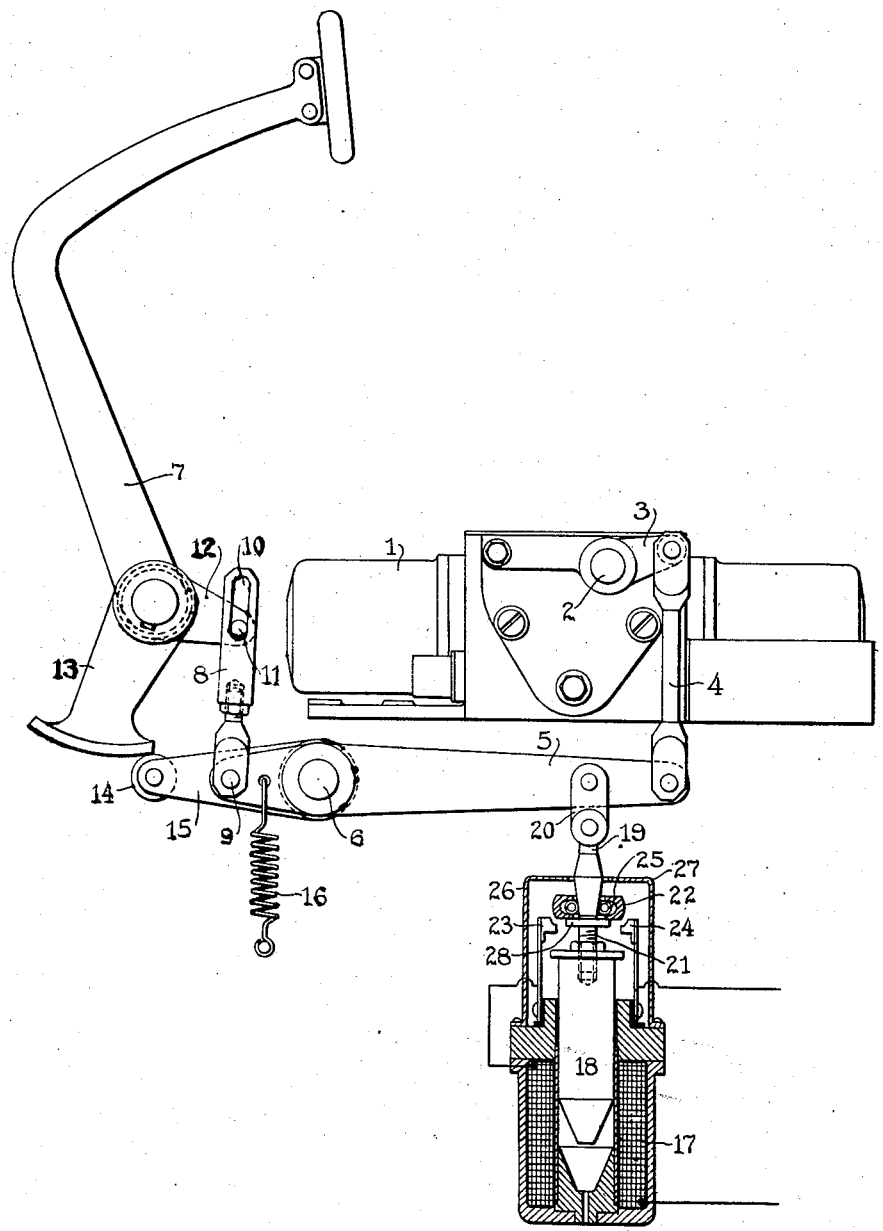
INVENTOR.
Henry J. Wiegand
BY Frank H. Hubbard
ATTORNEY

UNITED STATES PATENT OFFICE.

HENRY J. WIEGAND, OF MILWAUKEE, WISCONSIN, ASSIGNOR TO THE CUTLER-HAMMER MFG. CO., OF MILWAUKEE, WISCONSIN, A CORPORATION OF WISCONSIN.

GEAR-SHIFTING MECHANISM.

1,313,362.  Specification of Letters Patent.  Patented Aug. 19, 1919.

Application filed August 14, 1916. Serial No. 114,707.

*To all whom it may concern:*

Be it known that I, HENRY J. WIEGAND, a citizen of the United States, residing at Milwaukee, in the county of Milwaukee and State of Wisconsin, have invented new and useful Improvements in Gear - Shifting Mechanisms, of which the following is a full, clear, concise, and exact description, reference being had to the accompanying drawing, forming a part of this specification.

This invention relates to gear shifting mechanisms and is particularly applicable to those for automobiles.

In electromagnetic and other gear shifting mechanisms for automobiles it has been found advantageous to neutralize the controlled gears through the medium of the clutch lever and in some instances the increased load thus imposed upon the clutch lever has rendered its operation difficult and tiresome for the driver.

The present invention has among its objects to provide power means to assist in the neutralization of gears in such instances.

A further object is to provide a gear shifting mechanism including such power means wherein said means will respond only after disengagement of the clutch members, or, in other words, only after movement of the clutch pedal through a range greater than that required for disengagement of the clutch members.

A further object is to provide a gear shifting mechanism including power means for the purpose set forth wherein neutralization of gears may be effected by operation of the clutch lever should the power means for any reason fail to respond.

Other objects and advantages of the invention will hereinafter appear.

The accompanying drawing illustrates more or less schematically one embodiment of the invention and the same will now be described, it being understood that the invention may be embodied in other forms falling within the scope of the appended claims.

The drawing shows an inclosed electromagnetic shifting device 1 of the well known type disclosed in the application of W. A. McCarrell Serial No. 874,695, filed Nov. 30, 1914, now Patent No. 1258921, said device including a neutralizing mechanism having an operating shaft or element 2. The shaft 2 is rotatable in a clockwise direction for neutralizing operation and has fixed thereto an operating lever 3. The lever 3 is connected by a link 4 to a lever 5 fulcrumed upon a pivot 6 and operatively connected to a lever 7 provided for actuating the transmission clutch. The connection comprises a link 8 connected by a pin 9 to the lever 5, said link having therein a slot 10 to receive a pin 11 on an extension 12 of the clutch lever. With the clutch lever in normal position, *i. e.*, with the clutch parts engaged, the pin 11 stands at the lower end of the slot 10 whereby the clutch lever is permitted movement independently of the lever 5 during the travel of the pin 11 to the upper end of the slot, this movement of the clutch lever being utilized to disengage the clutch members through a cam 13 and roller 14. The cam 13 is fixed to the lever 7 while the roller 14 is carried by a lever 15 fixed to the shaft 6, which is operatively connected to the clutch disengaging means. The cam 13 is of such contour as to depress the lever 15 to the degree necessary for disengagement of the clutch members within the range of lost motion between the clutch lever 7 and the lever 5 and to thereafter permit continued movement of lever 7 without further depression of lever 15. Such continued movement of lever 7 lifts the link 8, through the medium of the pin 11, thereby rocking the lever 5 to rotate the shaft 2 of the neutralizing mechanism for neutralization of the controlled gears.

Thus the clutch lever provides for manual neutralization independently of the power means hereinafter specified and when released returns to normal position under the influence of the usual clutch spring. Such return movement of the clutch lever permits reëngagement of the clutch members and return of the neutralizing mechanism to normal position under the influence of a spring 16 acting upon lever 5.

Referring now to the power means for assisting in operating the neutralizing mechanism, the same comprises a solenoid 17 having a plunger 18 connected to lever 5 through a rod 19 and link 20. The link 20 is connected to the lever 5 between its fulcrum point and its point of connection to link 4 and the solenoid is so arranged as to attract its plunger in a direction to draw the lever 5 downwardly with the same result as depression of the clutch lever. The rod 19 is provided with a threaded portion 21 threading into the plunger for purposes of adjustment and said rod constitutes the actuating member for a contact 22 coöperating with stationary contacts 23 and 24 to control the circuit of the solenoid. The rod 19 is constructed to provide a cam member of the type disclosed in the Klein Patent No. 985,421 of Feb. 28, 1911, and the contact 22 is also of the type disclosed in said patent, the same being provided with a helical garter spring 25 surrounding the rod 19. It will thus be understood that the contact 22 may be moved in opposite directions with a snap action by reciprocation of the cam member or rod 19 through the spring 25 and it will be observed that the contacts 23 and 24 form stops for the contact 22 when moved in one direction while brackets 26 and 27 provide stops for said contact when moved in a reverse direction. The rod 19 is also provided with a stop 28 for the contact 22 and in normal position of the parts the stop holds said contact out of engagement with the contacts 23 and 24. Thus to effect engagement of the contacts it is necessary to move the rod 19 downwardly whereas if the downward movement of the rod be continued until the crest of its cam portion is passed through the spring 25 said contact will be snapped out of engagement with contacts 23 and 24. Then if the rod 19 be raised to force its cam portion through the spring 25 in a reverse direction the contact 22 will be snapped toward the contacts 23 and 24 but will be checked by the stop 28 before reëngaging said contacts.

Thus with the arrangement of parts above described neutralizing operation of the clutch lever will, through the initial movement of the lever 5, effect engagement of the contact 22 with contacts 23 and 24, thereby energizing the solenoid 17, which will thereupon respond to assist the clutch lever in continued operation of the lever 5 for neutralization. When the neutralizing operation has been completed, the parts being properly proportioned, the contact 22 will snap away from the contacts 23 and 24 thereby deënergizing the solenoid and restoring the control of the parts to the clutch lever exclusively. Then when the clutch lever is released the various parts, including contact 22, will be restored to their respective normal positions and without reënergization of the solenoid.

It is to be noted that should the clutch lever be prematurely released the stop 28 on the rod 19 will disengage the contact 22 from the contacts 23 and 24 and thereby immediately deënergize the solenoid to prevent conflict of forces. Also, it is to be noted that inasmuch as energization of the solenoid is dependent upon operation of the lever 5 the clutch lever may be operated at will to disengage and reëngage the clutch members without energization of said solenoid. In a a word, the solenoid will only respond when the clutch lever is operated to a definite neutralizing position and will remain energized only so long as the pull thereof is required for neutralizing operation.

What I claim as new and desire to secure by Letters Patent is:

1. In a gear shifting mechanism, the combination with a manually operable neutralizing element, of power means to assist in the operation thereof.

2. In a gear shifting mechanism, the combination with a manually operable neutralizing element, of power operating means therefor controllable thereby.

3. In a gear shifting mechanism, the combination with a manually operable neutralizing element, of power operating means therefor and means responsive to predetermined movements of said element to render said power means effective and ineffective.

4. In a gear shifting mechanism, the combination with a neutralizing element, of coacting manual and power operating means therefor, said manual means also being effective independently of said power means.

5. The combination with a gear shifting mechanism, of coacting manual and power operating means for a part thereof and means subjecting said power means to control by said manual means.

6. The combination with a gear shifting mechanism, of manual operating means for a part thereof, power operating means for said part and means rendering the response of said power means dependent upon prior operation of said manual means to a predetermined position and automatically terminating the action of said power means after a definite movement of said part.

7. The combination with a gear shifting mechanism, of a manual operating member for a part thereof, electromagnetic operating means for said part and means associated with said manual member to energize and deënergize said electromagnetic means.

8. The combination with a gear shifting mechanism, of a manual operating member for a part thereof, electromagnetic operating means for said part and means associated with said manual member to energize and deënergize said electromagnetic means, and to automatically deënergize said electromagnetic means upon a predetermined movement of said part.

9. In a gear shifting mechanism, the combination with a neutralizing element, of manual operating means therefor, electromagnetic means to assist said manual means and control means for said electromagnetic means governable by said manual means.

10. In a gear shifting mechanism, the combination with a neutralizing element, of manual operating means therefor, electromagnetic means to assist said manual means and a control device to energize said electromagnetic means upon movement of said manual means through a given range and to deënergize the same at the end of such range of said manual means and throughout the return movement of said manual means.

11. In a gear shifting mechanism, the combination with a neutralizing element, of manual operating means therefor, electromagnetic means to assist said manual means and a control means to energize said electromagnetic means upon movement of said manual means through a given range and to deënergize the same at the end of such range of said manual means and throughout the return movement of said manual means, said control means also acting to deënergize said electromagnetic means upon return movement of said manual means prior to completion of such range.

12. In a gear shifting mechanism for automobiles, the combination with a gear shifting device having a neutralizing element and a lost motion clutch lever connection therefor, of power means to assist in operating said neutralizing element and means subjecting said power means to control by a movable element of said connection.

13. In a gear shifting mechanism for automobiles, the combination with a gear shifting device having a neutralizing element and a lost motion clutch lever connection therefor, of electromagnetic means for assisting in operating said neutralizing element and a control switch for said electromagnetic means operatively connected to a movable element of said connection.

14. In a gear shifting mechanism, the combination with an operating shaft, of manual actuating means therefor, electromagnetic means to assist said manual means, and control means for said electromagnetic means' governable by said manual means.

15. The combination with a gear shifting mechanism of manual operating means for a part thereof, and power means to assist in the operation of said former means.

16. The combination with a gear shifting mechanism, of coacting manual and power operating means for a part thereof, said manual means also being effective independently of said power means.

In witness whereof, I have hereunto subscribed my name.

HENRY J. WIEGAND.